(12) United States Patent
Morefield et al.

(10) Patent No.: US 7,135,102 B2
(45) Date of Patent: Nov. 14, 2006

(54) METHOD AND SYSTEM FOR DEWATERING PARTICULATE MATERIALS

(75) Inventors: Sean W. Morefield, Champaign, IL (US); Charles A. Weiss, Jr., Clinton, MS (US); Philip G. Malone, Vicksburg, MS (US); Vincent F. Hock, Mahomet, IL (US); Michael K. McInerney, Champaign, IL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 539 days.

(21) Appl. No.: 10/421,922

(22) Filed: Apr. 24, 2003

(65) Prior Publication Data

US 2004/0211671 A1 Oct. 28, 2004

(51) Int. Cl.
*C25B 11/00* (2006.01)
*B01D 57/02* (2006.01)
(52) U.S. Cl. .................. 204/515; 204/516; 204/648
(58) Field of Classification Search .............. 204/515, 204/516, 648
See application file for complete search history.

(56) References Cited

U.S. PATENT DOCUMENTS

| | | |
|---|---|---|
| 4,110,682 A | 8/1978 | Tabanou |
| 4,367,132 A * | 1/1983 | Bell et al. .................. 204/518 |
| 5,015,351 A | 5/1991 | Miller |
| 6,372,109 B1 | 4/2002 | Bjerke et al. |

* cited by examiner

Primary Examiner—Arun S. Phasge
(74) Attorney, Agent, or Firm—Scott A. Felder; Nicholas J. Landau

(57) ABSTRACT

A system and method for dewatering particulate materials employs an improved dewatering probe generally including a single non-conducting pipe having a plurality of holes or slots, an anode mounted on the pipe adjacent one end of the pipe, and a cathode mounted on the pipe adjacent the opposite end of the pipe. The pipe serves as both a sonde for mounting the anode and cathode and as a well for extracting water that collects around the outside of the pipe and flows into the interior of the pipe through the holes or slots via gravitational and electro-osmotic forces. A pump may be used to extract both collected water and accumulated electrolytic gases from the pipe's interior. In embodiments, an array of guide electrodes is mounted on the pipe in addition to the anode and the cathode in order to deflect the major current flow out into the body of surrounding particulate materials. The guide electrodes also facilitate rapid depolarization of the probe. An array of probes according to the present invention may be employed as a system to dewater a volume of particulate.

30 Claims, 3 Drawing Sheets

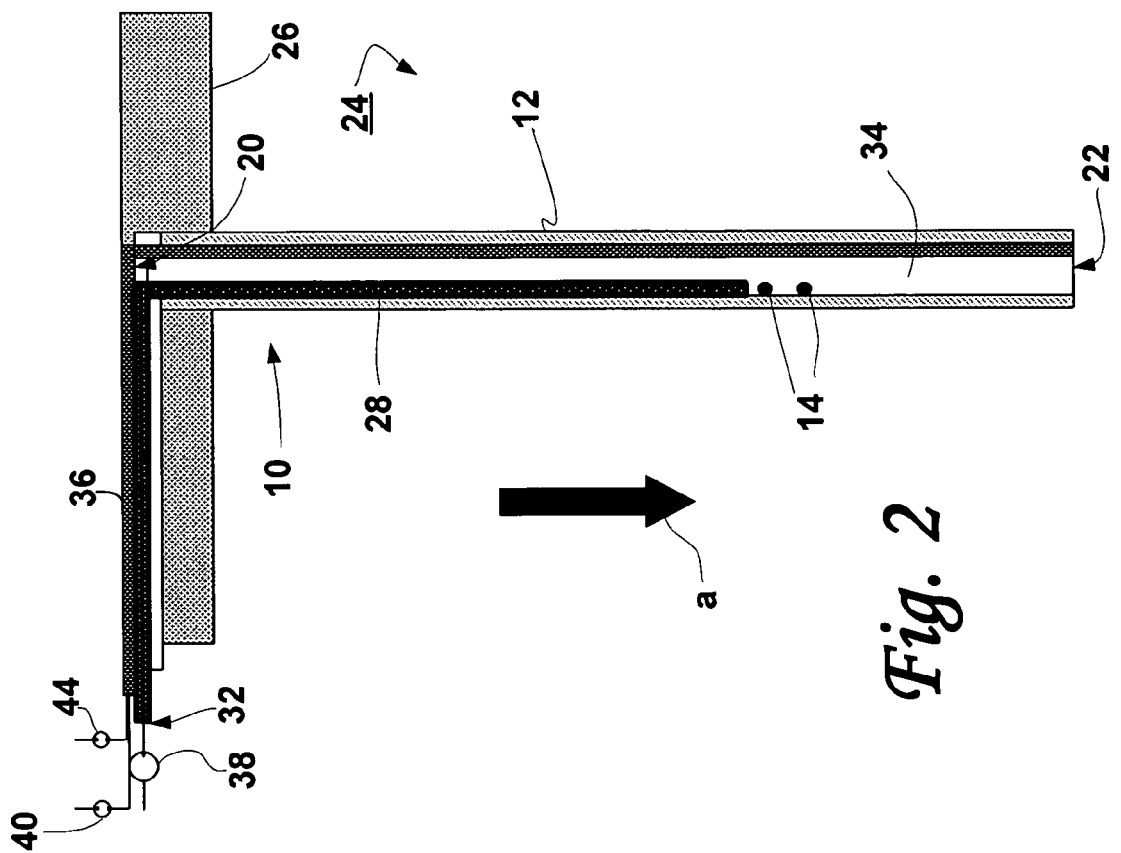
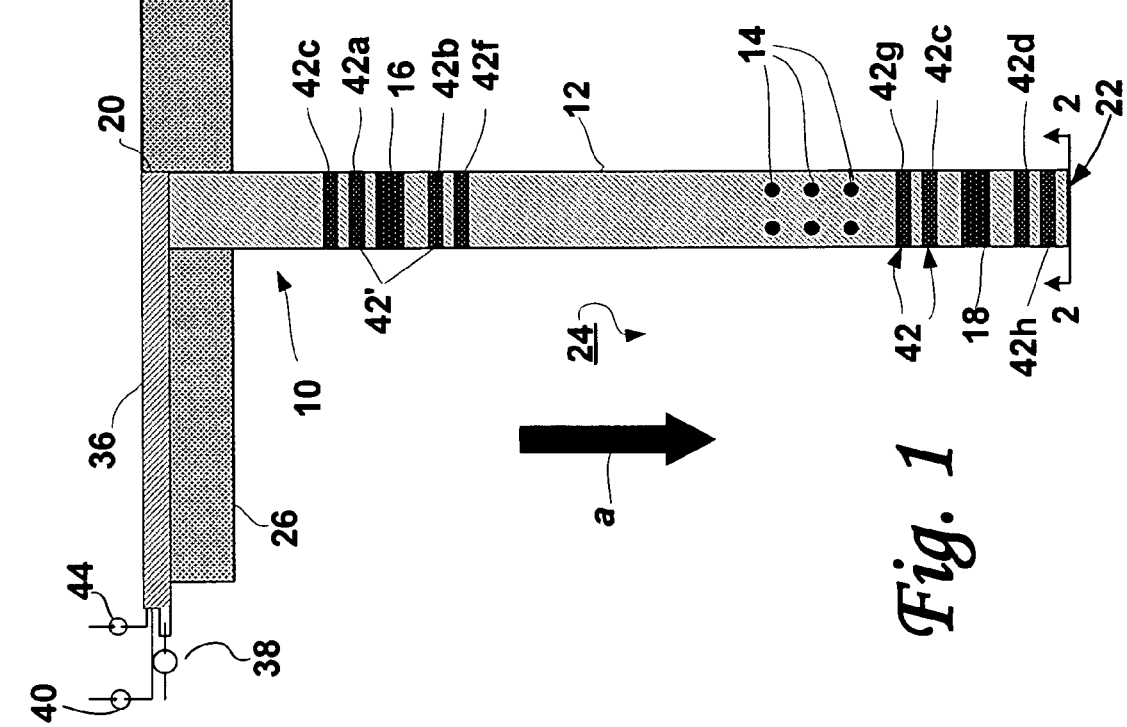

METHOD AND SYSTEM FOR DEWATERING PARTICULATE MATERIALS

CROSS-REFERENCES TO RELATED APPLICATIONS

Not Applicable.

STATEMENT REGARDING FEDERALLY SPONSORED RESEARCH OR DEVELOPMENT

The invention described herein may be manufactured and used by or for the United States Government for governmental purposes without the payment of any royalties thereon.

BACKGROUND OF THE INVENTION

1. Field of the Invention

The present invention relates generally to dewatering devices, and, more particularly, to an improved active and electro-osmotic dewatering system.

2. Background Description

Many common building and insulating materials have a capillary pore system that can become saturated with water. This is especially the case where the material, such as a building's foundation, is in contact with a particulate moisture source, such as soil. Long-term continuation of this saturated condition is undesirable and may lead to deterioration of the materials. Similarly, sludges, dredged spoils, and fine aggregates can become laden with moisture, making them unstable to stockpile and heavy to transport or dispose.

One traditional procedure for dewatering particulate materials is a combination of heating and ventilation. However, these procedures are very slow and utilize large amounts of energy. Further, as with any process utilizing heat, there is a risk of thermally induced warping and cracking of the structure.

Accumulated water may also be pumped from the particulate material. However, employing this method on any significant volume of particulate requires either a substantial number of pumps or a great deal of suction, as capillary forces in fine-grained materials make it difficult to extract water. Additionally, a simple pumping system is relatively easy to overwhelm with wet weather.

Another known technique for eliminating water from porous or particulate materials is electro-osmosis. The walls of the capillaries in most common building materials are covered with an electrically charged, adsorbed water film, referred to as an electrical double layer. It has been established that, if such a porous body is subjected to an electrical field, part of the double layer will tend to migrate under the influence of the field. Some of the free liquid in the pores is carried along with the double layer, leading to a significant reduction in the moisture content of the porous body or particulate.

There are, however, practical drawbacks to the use of electro-osmotic dewatering systems. First, conventional electro-osmotic systems are rather inefficient, and therefore relatively easily defeated by wet weather. The application of an electrical charge to a wall of porous building material typically involves the use of electrodes provided or installed in the porous material, and connected through the material to a grounding electrode. When the electrodes are polarized, there is a migration of water molecules towards the cathode. However, after the system has been in operation for a time, the electrodes become covered with coherent films of gas formed by electrochemical reactions at the electrode surfaces. These films have a very high electrical resistance, leading to deterioration in the electrical characteristics of the system and lowered system efficiency. A similar problem arises from the fact that the anodes of the system are subject to a high degree of electrolytic corrosion. Where electrodes are installed specifically for dewatering, this corrosion results initially in reduced system efficiency, and, eventually, in complete electrical discontinuity at the electrode. Thus, it becomes necessary to discontinue use of the system or replace the electrodes. Alternatively, where the structure's internal reinforcing steel is used as the anode, heavy corrosion of the electrode is damaging to the structure itself.

Accumulated gases present another problem in existing electro-osmotic dewatering systems. As noted above, any passage of current through water will result in some electrolysis of the water. This can generate hydrogen, oxygen, and chlorine gases that can accumulate in an empty extraction casing. These accumulated gases may also react, producing an undesirable energetic event, such as a fire or explosion.

Extant electro-osmotic dewatering systems also require a great deal of space to install. A typical electro-osmotic dewatering system, such as that taught by U.S. Pat. No. 6,372,109 to Bjerke et al., employs horizontally arranged electrodes and a surface array. These horizontally disposed systems generally use a separate steel casing as an anode and collect water at a cathode/extraction pipe situated away from the area to be dewatered—that is, at least two probes are required to accomplish the dewatering.

Prior art dewatering systems are also subject to encrustation in the extraction pipe. Where the metal is a cathode, the pH at the surface of the pipe rises, allowing precipitation of minerals from the groundwater. This precipitate can obstruct or clog the slots or perforations in the extraction pipe.

Electrical isolation is also a problem with existing electro-osmotic dewatering systems. If the surrounding soil is dewatered to such an extent that the resistance around the metal pipe increases, the dewatering circuit is effectively broken. Anyone touching the metal pipe, or even an extraction pump attached to the system, is a better conductor to ground than the metal pipe, making extant systems rather dangerous, especially for systems that run at high voltages.

SUMMARY OF THE INVENTION

Accordingly, it is an object of the present invention to provide a dewatering probe for use in a compact dewatering system.

A further object of the present invention is to provide a compact dewatering probe that is simple to install and uninstall.

It is another object of the present invention to provide a dewatering probe possessing rapid depolarization capabilities.

It is still another object of the present invention to provide a dewatering probe capable of controlling and removing gases produced by electro-osmosis.

Yet another object of the present invention is to provide a robust, less easily defeated dewatering system.

The present invention is a system and method for dewatering particulate materials based around an improved dewatering probe. The probe used in the system includes a single non-conducting pipe having a plurality of holes or slots, an anode mounted on the pipe adjacent one end of the pipe, and a cathode mounted on the pipe adjacent the opposite end of the pipe. The single pipe serves as both a sonde for mounting the anode and cathode and as a well for extracting water that collects around the outside of the pipe and flows into the interior of the pipe through the holes or slots. To this end, embodiments of the dewatering probe also include an extraction tube mounted inside the pipe at a first end and attached to the suction side of a pump at a second end.

In embodiments, an array of guide electrodes is mounted on the pipe in addition to the anode and the cathode. These guide electrodes serve to deflect the major current flow in the probe out into the body of surrounding particulate materials, and the polarities and positions of the individual guide electrodes are selected accordingly. Alternatively, the anode may be coupled to a slab covering the particulate material to be dewatered such that the slab functions as an expanded anode.

An array of dewatering probes according to the present invention may be employed as a system to dewater a volume of a particulate material. To do so, the probes are oriented substantially vertically in the particulate material, such that the anode is above the cathode. Upon application of a voltage to the anode and the cathode, electro-osmotic forces will tend to draw moisture towards the cathode, where it can flow through the holes or slots and into the interior of the pipe. Gravitational forces will also cause water to flow towards the holes or slots and into the pipe interior. When the first end of the extraction tube is submerged, accumulated water may be pumped out of the pipe and discharged appropriately. When the first end of the extraction tube is not submerged, electrolytic gases accumulated within the pipe may vent to ambient through the extraction tube. Further, the polarity of the anode and cathode may periodically be reversed in order to depolarize the anode and cathode.

Further advantages of the present invention will be apparent from the description below with reference to the accompanying drawings, in which like numbers indicate like elements.

BRIEF DESCRIPTION OF THE DRAWINGS

FIG. 1 is an exterior view of a dewatering probe according to the present invention.

FIG. 2 is a cross-sectional view of the dewatering probe of FIG. 1 taken along line 2—2.

DETAILED DESCRIPTION OF PREFERRED EMBODIMENTS OF THE INVENTION

Figure 3:
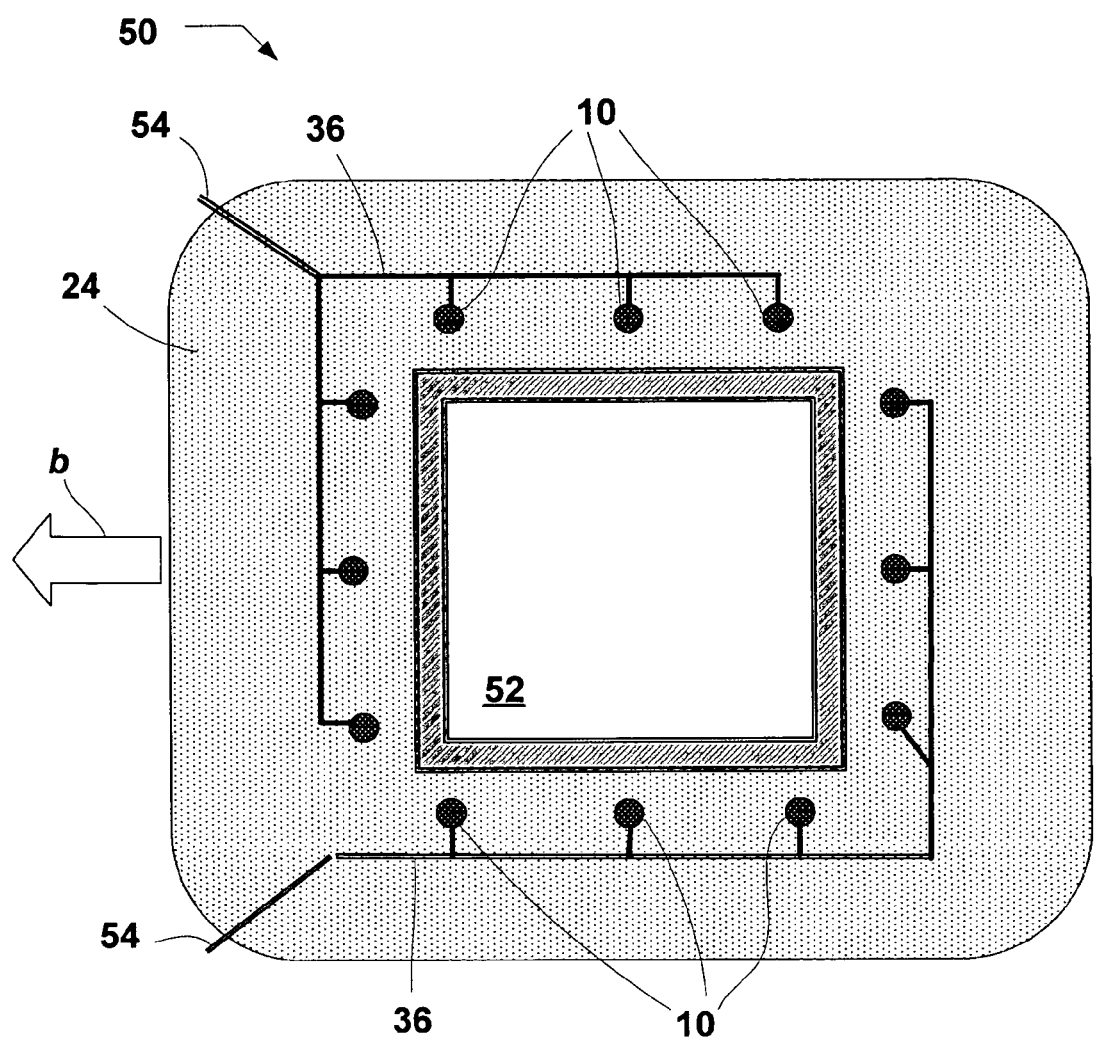
FIG. 3 is a perspective view of a dewatering system according to the present invention employed to dewater the soil immediately adjacent to a sub-grade structure.

Referring now to the drawings, and specifically to FIGS. 1 and 2, there is shown a probe 10 for dewatering a particulate material according to the present invention. Dewatering probe 10 generally includes a non-conducting pipe 12 having a plurality of drainage holes or slots 14. An anode 16 and a cathode 18 are mounted on non-conducting pipe 12 adjacent opposing top and bottom ends 20, 22, respectively, thereof. Pipe 12 functions both as a sonde for mounting anode 16 and cathode 18 and as a well used to extract water that collects around the outside of and flows into pipe 12 via holes 14.

In FIGS. 1 and 2, probe 10 is shown oriented in a particulate material 24 beneath a concrete slab 26 such that anode 16 is above cathode 18. This substantially vertical orientation is preferred, as water will flow in the direction of arrowhead a due to both gravity and electro-osmotic forces, whereas an inverse configuration (that is, with cathode 18 above anode 16) would cause water flow due to electro-osmosis to oppose the force of gravity. In embodiments, anode 16 is coupled to slab 26, allowing slab 26 to function as an expanded anode 16.

Use of a non-conducting pipe 12 reduces the electrocution hazard posed by probe 10. Further, it facilitates placement of both anode 16 and cathode 18 on a single probe 10. This, in turn, makes the present invention safer, more compact, and simpler to install than prior art systems. For example, probe 10 may be installed to dewater particulate material 24 beneath a concrete slab 26 simply by drilling a single borehole through slab 26 into particulate material 24 and inserting probe 10.

To facilitate the removal of water and gases collected within pipe 12, probe 10 may also include an extraction tube 28 having a first end 30 and a second end 32. First end 30 is located within an interior 34 of pipe 12, for example via a conduit 36, while second end 32 is located outside of interior 34 (that is, open to the environment). When the water collected within pipe 12 does not cover first end 30 of extraction tube 28, environmental air will flow through conduit 36 attached to top end 20 of pipe 12 and into interior 34 of pipe 12, sweeping accumulated electrolytic gases, such as hydrogen, chlorine, and oxygen, from within interior 34 of pipe 12 and venting them to the environment via extraction tube 28. The ability of the present invention to vent accumulated gases significantly reduces the likelihood of fire or explosion, and also reduces the occurrence of encrustation of the casing (that is, the clogging of holes 14), corrosion of the electrodes, and other problems associated with the accumulation of gases within pipe 12.

When the water level does cover first end 30, second end 32 may be attached to the suction end of a pump 38 to remove collected water from within pipe 12. The discharge end of pump 38 is located appropriately, for example, via a connection to a storm drain or sanitary sewer. By combining electro-osmotic and active (gravity plus pumping) dewatering, the performance of the present invention in extremely wet weather is enhanced. Pump 38 may also be used to augment the natural venting of accumulated electrolytic gases as described above.

Anode 16 and cathode 18 are electrically coupled to a direct current (DC) voltage source 40, the wiring for which may run through conduit 36. In embodiments, anode 16 and cathode 18 are capable of reversing polarities, such that anode 16 becomes a cathode and cathode 18 becomes an anode, thereby facilitating depolarization of anode 16 and cathode 18.

Preferably, probe 10 also includes at least one guide electrode 42 mounted on pipe 12 adjacent at least one of anode 16 and cathode 18 and electrically coupled to a DC voltage source 44, also through conduit 36. In embodiments, the at least one guide electrode 42 is at least two guide electrodes 42, which are mounted on opposite sides of at least one of anode 16 and cathode 18, and that constitute at least one guide electrode pair 42'. In the preferred embodiment of the invention, there are four guide electrode pairs 42': adjacent first and second guide electrode pairs mounted adjacent anode 16, and adjacent third and fourth guide electrode pairs mounted adjacent cathode 18. In embodiments where anode 16 is coupled to slab 26, it is unnecessary, but permissible, to employ guide electrodes 42 around anode 16.

Preferably, guide electrodes 42 and guide electrode pairs 42' adjacent anode 16, such as guide electrodes 42a and 42b, possess a positive polarity with respect to ground, while guide electrodes 42 and guide electrode pairs 42' adjacent cathode 18, such as guide electrodes 42c and 42d, possess a negative polarity with respect to ground. That is, guide electrodes 42 and guide electrode pairs 42' adjacent anode 16 share the polarity of anode 16, while those adjacent cathode 18 share its polarity. Adjacent guide electrodes 42 and guide electrode pairs 42' preferably have opposite polarities, such that guide electrodes 42e and 42f possess a negative polarity with respect to ground, and guide electrodes 42g and 42h possess a positive polarity with respect to ground.

As one skilled in the art should recognize, guide electrodes 42 serve to direct or deflect the major current flow in probe 10 out into the body of surrounding particulate material 24, allowing a greater volume of particulate material 24 to be dewatered by a single probe 10. Guide electrodes 42 also serve to increase the speed of depolarization of anode 16 and cathode 18. Depolarization involves reversing the polarities of anode 16 and cathode 18 for a period of time so the clouds of ions around those electrodes are dispersed. When anode 16 and cathode 18 are reversed, surrounding guide electrodes 42 will have the opposite polarization rather than the identical polarization, moving charges away from anode 16 or cathode 18 quickly and efficiently. Preferably, the duration of reversed polarity is between one-tenth and one-fifth, inclusive, of the duration of the forward polarity. However, one skilled in the art will understand how to select an appropriate duration of reversed polarity to achieve depolarization of anode 16 and cathode 18.

Refer to FIG. 3. Operation of a dewatering system 50 according to the present invention typically requires a voltage of 40 volts DC, though the actual voltage will depend on the particular application of dewatering system 50. The use of relatively low voltages minimizes the electrocution hazard, as skin resistance is generally too high to pass sufficient current to affect the heart at such voltages.

Turning now to FIG. 3, a plurality of dewatering probes 10 are shown employed as a system 50 for dewatering a volume of particulate material 24, for example, the soil immediately adjacent to a sub-grade structure 52 such as a basement or trench. Arrow b indicates grade. By appropriately deploying a number of dewatering probes 10 as an array within particulate material 24, and by appropriately choosing the polarity, quantity, and placement of guide electrodes 42 on dewatering probes 10 so as to optimize and enhance propagation of an electric field into particulate 24, it is possible to dewater any volume of particulate material 24. In the embodiment of FIG. 3, an array of dewatering probes 10, interconnected by conduits 36, is provided on each side of sub-grade structure 52. Conduits 36 are connected to appropriate drainage 54. The potential on guide electrodes 42 may be varied in order to control the volume of particulate 24 dewatered or the rate of dewatering.

Figure 4:
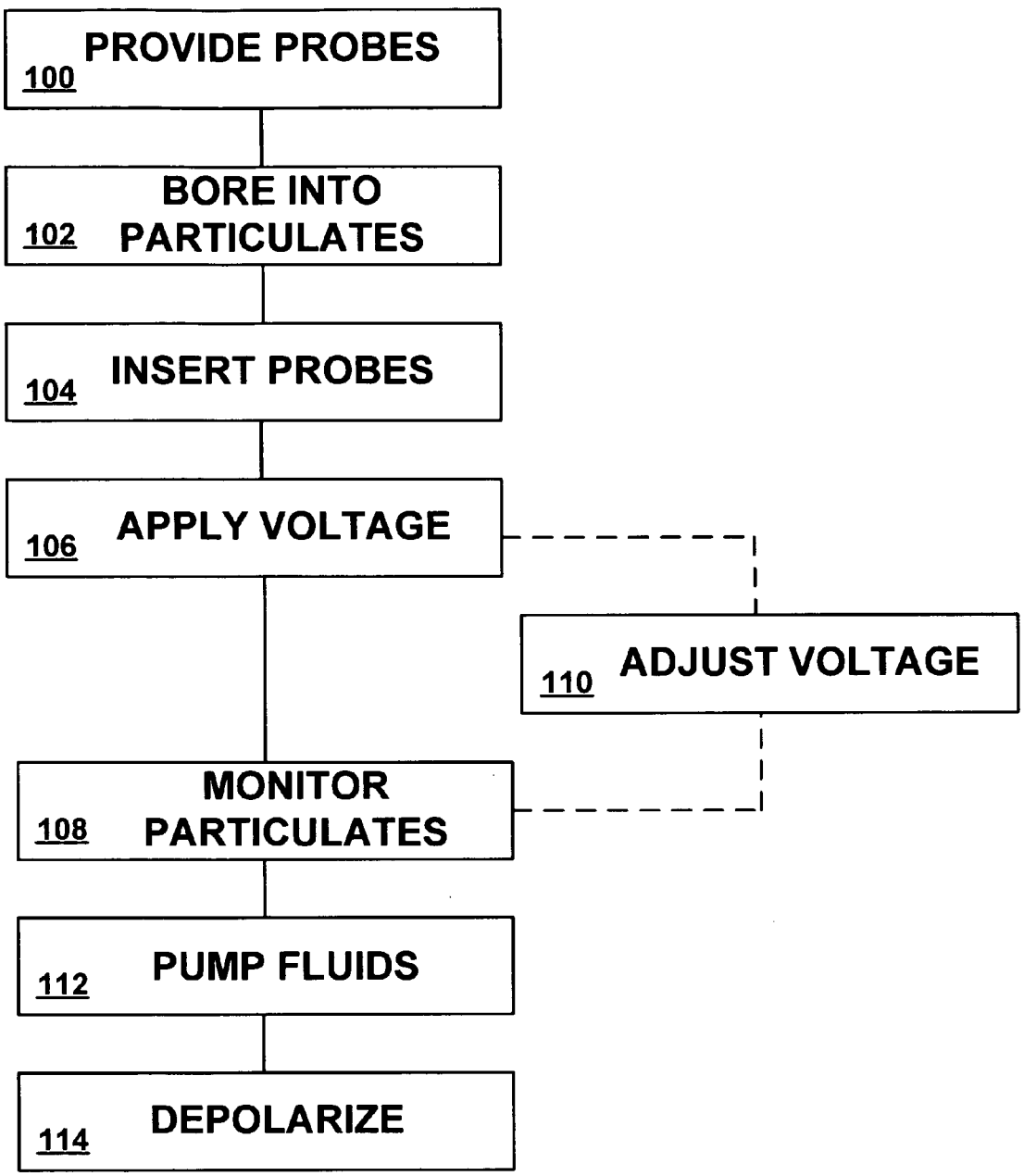
FIG. 4 is a block diagram illustrating use of the present invention.

Use of the present invention will be described with reference to FIG. 4. Depending on the area to be dewatered, one probe 10 or an array of probes 10 are provided in step 100. In step 102, a corresponding number of substantially vertical holes are bored into particulate material 24. Probes 10 are then inserted into the boreholes in step 104. As described above, anode 16 should be above cathode 18. Water will begin collecting within probe 10 as a result of gravitational forces.

Electro-osmotic dewatering begins when a voltage is applied to anode 16, cathode 18, and any guide electrodes 42 mounted on probe 10 in step 106, generating an electric field in particulate material 24 and drawing water towards cathode 18. As noted above, the applied voltage preferably does not exceed 40 volts DC, though higher voltages may be employed in certain embodiments.

In optional step 108, particulate material 24 is monitored for at least one of current and water content by any known means. For example, if current is monitored, a voltage drop between a set of monitoring electrodes in the vicinity of probe 10 may be measured. The applied voltage can be adjusted in response step 110 to maintain a predetermined degree of dryness in particulate material 24.

When the water level within probe 10 reaches a certain level, as described above, water is pumped through extraction tube 28 from the interior of probe 10 in step 112. At other times, as described above, accumulated gases are permitted to vent to ambient, through extraction tube 28. Accumulated gases may also be actively removed by the action of suction pump 38. Depolarization of anode 16 and cathode 18 is accomplished in step 114 by periodically reversing the polarity of anode 16 and cathode 18, allowing the clouds of ions collected around anode 16 and cathode 18 to disperse. As described above, the preferred duration of the period of reversed polarity is between one-tenth and one-fifth, inclusive, of the duration of the period of forward polarity.

While the invention has been described in terms of its preferred embodiments, those skilled in the art will recognize that the invention can be practiced with modifications within the spirit and scope of the appended claims. For example, though the invention has been described and illustrated as installed below a slab and around a foundation, one skilled in the art will recognize that the invention could equally well be employed to remove water from dredged spoils to produce stable masses of soil. Thus, it is intended that all matter contained in the foregoing description or shown in the accompanying drawings shall be interpreted as illustrative rather than limiting, and the invention should be defined only in accordance with the following claims and their equivalents.

What is claimed is:

1. A probe for dewatering a particulate material, said probe comprising:
   a non-conducting pipe having a plurality of holes;
   an anode mounted adjacent a first end of said pipe;
   a cathode mounted adjacent a second end of said pipe; and
   at least one guide electrode mounted on said pipe adjacent at least one of said anode and said cathode, said at least one guide electrode capable of being electrically coupled to a DC voltage source.

2. The probe according to claim 1, wherein said at least one guide electrode possesses a positive polarity with respect to ground when mounted adjacent said anode and a negative polarity with respect to ground when mounted adjacent said cathode.

3. The probe according to claim 1, wherein said at least one guide electrode is at least two guide electrodes.

4. The probe according to claim 3, wherein adjacent ones of said at least two guide electrodes have opposing polarities.

5. The probe according to claim 3, wherein said at least two guide electrodes comprise at least one guide electrode pair mounted on said pipe adjacent at least one of said anode and said cathode.

6. The probe according to claim 5, wherein said at least one guide electrode pair possesses a positive polarity with respect to ground when mounted adjacent said anode and a negative polarity with respect to ground when mounted adjacent said cathode.

7. The probe according to claim 5, wherein said at least one guide electrode pair is at least two guide electrode pairs.

8. The probe according to claim 7, wherein said at least two guide electrode pairs comprises:
 a first guide electrode pair mounted on said pipe adjacent said anode;
 a second guide electrode pair mounted on said pipe adjacent said first guide electrode pair;
 a third guide electrode pair mounted on said pipe adjacent said cathode; and
 a fourth guide electrode pair mounted on said pipe adjacent said second guide electrode pair.

9. The probe according to claim 8, wherein a polarity of said first guide electrode pair and said fourth guide electrode pair is positive with respect to ground and a polarity of said second guide electrode pair and said third guide electrode pair is negative with respect to ground.

10. A method for dewatering a particulate material, comprising the steps of:
 providing at least one dewatering probe, the at least one dewatering probe comprising a pipe having a plurality of holes and an anode and a cathode mounted on the pipe adjacent opposing ends thereof;
 boring at least one substantially vertical hole into the particulate material;
 inserting the at least one dewatering probe into the at least one substantially vertical hole such that the anode is above the cathode; and
 applying a voltage to the anode and the cathode on the at least one probe to produce an electric field in the particulate material.

11. The method according to claim 10, further comprising the step of alternating a polarity of the voltage applied to the anode and the cathode on the at least one probe.

12. The method according to claim 11, wherein a duration of a reversed phase of said step of alternating a polarity of the voltage is one-tenth to one-fifth, inclusive, of a duration of a forward phase of said step of alternating a polarity of the voltage.

13. The method according to claim 10, further comprising the step of pumping at least one of collected water and accumulated electrolytic gases from an interior of the pipe of the at least one probe.

14. The method according to claim 10, wherein said step of providing at least one dewatering probe comprises providing an array of dewatering probes.

15. The method according to claim 10, further comprising the steps of:
 providing at least one guide electrode mounted on said pipe; and
 applying a voltage to the at least one guide electrode to amplify the electric field in the particulate material.

16. The method according to claim 10, further comprising the steps of:
 monitoring at least one of a current in the particulate material and a water content in the particulate material; and
 adjusting the voltage applied to the anode and the cathode on the at least one probe in response to at least one of the current in the particulate material and the water content in the particulate material such that a predetermined degree of dryness is maintained.

17. A system for dewatering a volume of a particulate material, said system comprising: at least one dewatering probe, said at least dewatering probe comprising a nonconducting pipe having a plurality of holes and an anode and a cathode mounted on said pipe adjacent opposing ends thereof, said at least one dewatering probe being substantially vertically disposed within said particulate material such that said anode and said cathode; said generator for applying a DC voltage to said anode and said cathode, said generator being electrically coupled to said anode and said cathode on said at least one dewatering probe; and a pump having a suction end coupled to an extraction tube having an end located within an interior of said pipe; wherein said at least one dewatering probe further comprises at least one guide electrode mounted on said pipe and electrically coupled to a DC voltage source, a polarity, a quantity, and a pattern of said at least one guide electrode on said pipe being selected to enhance propagation of an electric field into the particulate material.

18. A system for dewatering a volume of a particulate material, said system comprising: at least one dewatering probe, said at least one dewatering probe comprising a non-conducting pipe having a plurality of holes and an anode and a cathode mounted on said pipe adjacent opposing ends thereof, said at least one dewatering probe being substantially vertically disposed within said particulate material such that said anode is above said cathode; a generator for applying a DC voltage to said anode and said cathode, said generator being electrically coupled to said anode and said cathode on said at least one dewatering probe; and a pump having a suction end coupled to an extraction tube having an end located within an interior of said pipe; wherein said anode on said at least one dewatering probe is electrically coupled to a slab covering the particulate material.

19. A probe for dewatering a particulate material, said probe comprising:
 a non-conducting pipe having a plurality of holes;
 an anode mounted adjacent a first end of said pipe; and
 a cathode mounted adjacent a second end of said pipe, wherein said anode is electrically coupled to a concrete slab covering said particulate material.

20. The probe according to claim 19, further comprising at least one guide electrode mounted on said pipe adjacent at least one of said anode and said cathode, said at least one guide electrode capable of being electrically coupled to a DC voltage source.

21. The probe according to claim 20, wherein said at least one guide electrode possesses a positive polarity with respect to ground when mounted adjacent said anode and a negative polarity with respect to ground when mounted adjacent said cathode.

22. The probe according to claim 21, wherein said at least one guide electrode is at least two guide electrodes.

23. The probe according to claim 22, wherein adjacent ones of said at least two guide electrodes have opposing polarities.

24. The probe according to claim 22, wherein said at least two guide electrodes comprise at least one guide electrode pair mounted on said pipe adjacent at least one of said anode and said cathode.

25. The probe according to claim 24, wherein said at least one guide electrode pair possesses a positive polarity with respect to ground when mounted adjacent said anode and a negative polarity with respect to ground when mounted adjacent said cathode.

26. The probe according to claim 24, wherein said at least one guide electrode pair is at least two guide electrode pairs.

27. The probe according to claim 26, wherein said at least two guide electrode pairs comprises:
- a first guide electrode pair mounted on said pipe adjacent said anode;
- a second guide electrode pair mounted on said pipe adjacent said first guide electrode pair;
- a third guide electrode pair mounted on said pipe adjacent said cathode; and
- a fourth guide electrode pair mounted on said pipe adjacent said second guide electrode pair.

28. The probe according to claim 27, wherein a polarity of said first guide electrode pair and said fourth guide electrode pair is positive with respect to ground and a polarity of said second guide electrode pair and said third guide electrode pair is negative with respect to ground.

29. A system for dewatering a volume of a particulate material, said system comprising:
- at least one dewatering probe, comprising:
  - a non-conducting pipe having a plurality of holes;
  - an anode mounted near a first end of said pipe;
  - a cathode mounted near an end of said pipe opposing said first end, wherein said probe is disposed substantially vertically within said particulate material such that said anode is above said cathode;
  - at least one guide electrode mounted on said pipe,
  - at least one DC source;
- wherein at least one said source is in operable communication with said anode and said cathode on said probe, and
- wherein said guide electrodes are in operable communication with at least one said DC source, and
- wherein a polarity, a quantity, and a pattern of said guide electrodes may be selected to enhance propagation of an electric field into said particulate material;
  - an extraction tube in operable communication with said probe, said tube having an end located within said pipe; and
- a pump in operable communication with at least said extraction tube.

30. The system according to claim 29, wherein said anode on said probe is in operable communication with a slab covering the particulate material.

* * * * *